(12) United States Patent
Miles et al.

(10) Patent No.: US 6,710,908 B2
(45) Date of Patent: Mar. 23, 2004

(54) CONTROLLING MICRO-ELECTRO-MECHANICAL CAVITIES

(75) Inventors: Mark W. Miles, San Francisco, CA (US); Clarence Chui, Emeryville, CA (US)

(73) Assignee: Iridigm Display Corporation, San Francisco, CA (US)

( * ) Notice: Subject to any disclaimer, the term of this patent is extended or adjusted under 35 U.S.C. 154(b) by 0 days.

(21) Appl. No.: 10/076,224

(22) Filed: Feb. 13, 2002

(65) Prior Publication Data

US 2002/0149828 A1 Oct. 17, 2002

Related U.S. Application Data

(63) Continuation-in-part of application No. 09/974,544, filed on Oct. 10, 2001, and a continuation-in-part of application No. 09/378,143, filed on Aug. 20, 1999, now abandoned, and a continuation-in-part of application No. 09/056,975, filed on Apr. 8, 1998, which is a division of application No. 08/769,947, filed on Dec. 19, 1996, now abandoned, which is a continuation of application No. 08/744,253, filed on Nov. 5, 1996, now Pat. No. 5,986,796, which is a continuation-in-part of application No. 08/554,630, filed on Nov. 6, 1995, now abandoned, which is a continuation-in-part of application No. 08/238,750, filed on May 5, 1994, now Pat. No. 5,835,255.

(51) Int. Cl.[7] .............................................. G02B 26/00
(52) U.S. Cl. ........................ 359/290; 359/291; 359/292; 372/20; 372/32
(58) Field of Search ................................ 359/245, 247, 359/2, 52, 254, 25, 5, 290–292, 577, 578; 356/519, 454, 345; 372/20, 32; 385/14, 16, 24; 345/85

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,813,265 A | 5/1974 | Marks |
| 3,955,880 A | 5/1976 | Lierke |
| 4,099,854 A | 7/1978 | Decker et al. |
| 4,228,437 A | 10/1980 | Shelton |
| 4,377,324 A | 3/1983 | Durand et al. |
| 4,389,096 A | 6/1983 | Hori et al. |
| 4,392,711 A * | 7/1983 | Moraw et al. ............... 359/292 |
| 4,403,248 A | 9/1983 | te Velde |
| 4,445,050 A | 4/1984 | Marks |
| 4,459,182 A | 7/1984 | te Velde |
| 4,519,676 A | 5/1985 | te Velde |
| 4,531,126 A | 7/1985 | Sadones |
| 4,663,083 A | 5/1987 | Marks |
| 4,681,403 A | 7/1987 | te Velde et al. |
| 4,748,366 A | 5/1988 | Taylor |
| 4,786,128 A | 11/1988 | Birnbach |
| 4,790,635 A | 12/1988 | Apsley |
| 4,857,978 A * | 8/1989 | Goldburt et al. ............ 359/292 |
| 4,900,136 A * | 2/1990 | Goldburt et al. ............ 359/291 |

(List continued on next page.)

FOREIGN PATENT DOCUMENTS

| | | |
|---|---|---|
| EP | 0667548 A1 | 8/1995 |
| JP | 405275401 A1 | 10/1993 |
| WO | WO 95 30924 | 11/1995 |

*Primary Examiner*—Georgia Epps
*Assistant Examiner*—M. Hasan
(74) *Attorney, Agent, or Firm*—Blakely, Sokoloff, Taylor & Zafman, LLP

(57) ABSTRACT

Among other things, a cavity having a cavity dimension is configured so that the cavity dimension changes in response to electrostatic forces applied to the cavity, and at least two electrical structures are configured to apply electrostatic forces in the vicinity of the cavity, the electrical structures being independently controllable.

29 Claims, 8 Drawing Sheets

U.S. PATENT DOCUMENTS

| | | |
|---|---|---|
| 4,900,395 A | 2/1990 | Syverson et al. |
| 4,982,184 A | 1/1991 | Kirkwood |
| 5,022,745 A | 6/1991 | Zayhowski et al. |
| 5,044,736 A | 9/1991 | Jaskie et al. |
| 5,075,796 A | 12/1991 | Schildkraut et al. |
| 5,078,479 A | 1/1992 | Vuilleumier |
| 5,124,834 A | 6/1992 | Cusano et al. |
| 5,142,414 A | 8/1992 | Koehler |
| 5,153,771 A | 10/1992 | Link et al. |
| 5,168,406 A | 12/1992 | Nelson |
| 5,228,013 A | 7/1993 | Bik |
| 5,231,532 A | 7/1993 | Magel et al. |
| 5,233,459 A | 8/1993 | Bozler et al. |
| 5,293,272 A | 3/1994 | Jannson et al. |
| 5,311,360 A | 5/1994 | Bloom et al. |
| 5,324,683 A | 6/1994 | Fitch et al. |
| 5,326,430 A | 7/1994 | Cronin et al. |
| 5,358,601 A | 10/1994 | Cathey |
| 5,381,253 A | 1/1995 | Sharp et al. |
| 5,401,983 A | 3/1995 | Jokerst et al. |
| 5,459,610 A | 10/1995 | Bloom et al. |
| 5,497,172 A | 3/1996 | Doherty et al. |
| 5,500,635 A | 3/1996 | Mott |
| 5,500,761 A | 3/1996 | Goossen et al. |
| 5,526,327 A | 6/1996 | Cordova, Jr. |
| 5,552,925 A | 9/1996 | Worley |
| 5,579,149 A | 11/1996 | Moret et al. |
| 5,619,059 A | 4/1997 | Li et al. |
| 5,629,790 A | 5/1997 | Neukermans et al. |
| 5,636,052 A | 6/1997 | Arney et al. |
| 5,636,185 A | 6/1997 | Brewer et al. |
| 5,673,139 A | 9/1997 | Johnson |
| 5,683,591 A | 11/1997 | Offenberg |
| 5,703,710 A | 12/1997 | Brinkman et al. |
| 5,710,656 A | 1/1998 | Goossen |
| 5,726,480 A | 3/1998 | Pister |
| 5,739,945 A | 4/1998 | Tayebati |
| 5,784,190 A | 7/1998 | Worley |
| 5,793,504 A | 8/1998 | Stoll |
| 5,808,780 A | 9/1998 | McDonald |
| 5,825,528 A | 10/1998 | Goossen |
| 5,835,255 A | 11/1998 | Miles |
| 5,943,158 A | 8/1999 | Ford et al. |
| 6,055,090 A | 4/2000 | Miles |
| 6,100,872 A | 8/2000 | Aratani et al. |
| 6,243,149 B1 | 6/2001 | Swanson et al. |

* cited by examiner

CONTROLLING MICRO-ELECTRO-MECHANICAL CAVITIES

This application is continuation-in-part of U.S. patent application Ser. No. 09/378,143, filed Aug. 20, 1999, now abandoned, which is a continuation of U.S. patent application Ser. No. 08/744,253 filed Nov. 5, 1996, now issued as U.S. Pat. No. 5,986,796: a continuation-in-part of U.S. patent application Ser. No. 09/056,975, filled Apr. 8, 1998; and a continuation-in-part of U.S. patent application Ser. No. 09/974,544, filled Oct. 10, 2001, which is a divisional of U.S. patent application Ser. No. 08/769,947, filed Dec. 19, 1996, now abandoned, which is a continuation-in-part of U.S. patent application Ser. No. 08/554,630 filed Nov. 6, 1995, now abandoned, which is a continuation-in-part of U.S. patent application Ser. No. 08/238,750, filed May 5, 1994, now issued as U.S. Pat. No. 5,835,255, all incorporated here by reference.

BACKGROUND

This invention relates to controlling micro-electro-mechanical cavities.

As shown in FIG. 1, a micro-electro-mechanical structure (MEMS) 10 can be formed to have two walls 12, 14 connected mechanically 16 to define a cavity 18. The walls of the cavity can be movable relative to one another to control, for example, interferometric optical properties of the cavity. An electrode 20 can be formed on one of the walls so that, when a sufficient voltage $V_A$ (see FIG. 2) from a voltage source 24 is applied between the electrode and the opposite wall 12, the activation threshold of the cavity is exceeded and the wall 12 is drawn close to the wall 14 by electrostatic force 26. Because of a hysteresis effect, the wall 12 will then remain close to wall 14 even if the voltage falls below $V_A$. Only when the voltage falls below a lower value, $V_B$, will the wall 12 return to its original position.

SUMMARY

In general, in one aspect, the invention features apparatus that includes a cavity having a cavity dimension, the cavity being configured so that the cavity dimension changes in response to electrostatic forces applied to the cavity, and at least two electrical structures configured to apply electrostatic forces in the vicinity of the cavity, the electrical structures being independently controllable.

Implementations of the invention may include the following features. The cavity dimension is determined by a distance between two walls, and the cavity dimension determines optical properties of the cavity. The optical properties include interference or reflectance. The two electrical structures comprise electrodes. The electrical structures lie on a wall of the cavity. The electrical structures lie side by side on the wall of the cavity. The cavity comprises an interference modulator and the cavity dimension determines an optical state of the modulator. Changes in the cavity dimension that occur in response to the electrostatics forces are characterized by hysteresis. There is also a second cavity adjacent to the cavity. The cavity and the second cavity share a common wall.

There are also stops within the cavity, the stops defining an intermediate cavity dimension between a minimum cavity dimension and a maximum cavity dimension the stops define channels between them portions of a wall of the cavity lie in response to electrostatic forces. One of the electrical structures comprises electrodes embedded within the stops. The stops lie on a movable wall of the cavity. Apertures in a second wall of the cavity are configured to receive the stops. There are also additional cavities having cavity dimensions, each of the cavities being configured so that its cavity dimension changes in response to electrostatic forces applied to the cavity. There are additional electrical structures configured to apply electrostatic forces in the vicinities of the cavities, each of the additional cavities being associated with at least two of the additional electrical structures. The electrical structures with which each of the cavities is associated are independently controllable. At least some of the electrical structures associated with at least some of the respective cavities are coupled together.

The cavities are organized in groups by coupling together of selected electrical structures. The coupling comprises bus conductors. The coupling comprises bus elements fabricated on multiple levels of the apparatus.

In general, in another aspect, the invention features apparatus that includes an array of interferometric modulators, actuation electrodes associated with the respective interferometric modulators, and a pattern of conductors connecting the actuation electrodes in groups.

Implementations of the invention may include the following features. The groups comprise rows or columns of the actuation electrodes. The groups comprise pixels of a display. Each of the interferometric modulators is associated with more than one of the electrodes. The pattern of conductors connects different ones of the electrodes associated with each of the interferometric modulators in a configuration that enables them to be energized independently. The electrodes are arranged on walls of cavities of the interferometric modulators.

In general, in another aspect, the invention features a method that includes energizing one electrical structure to apply an electrostatic force in the vicinity of a cavity, and independently energizing another electrical structure to apply an electrostatic force in the vicinity of a cavity.

Implementations of the invention may include the following features. The one structure is energized to move an element of the cavity to a first position, and the other electrical structure is energized to maintain the element in the first position. The one structure is de-energized while the other structure remains energized. The energizing of the one electrical structure and the other electrical structure is controlled to effect more than two optical states of the cavity. One electrical structure is energized to apply an electrostatic force in the vicinity of each of multiple other cavities, and another electrical structure is independently energized to apply an electrostatic force in the vicinity of each of the multiple other cavities. The energizing of the electrical structures is controlled to independently control the optical states of groups of one or more of the cavities.

Other advantages and features will become apparent from the following description and from the claims.

DESCRIPTION

FIGS. 7, 9, 10, 11, 13, 14, 15, and 16 are side sectional views of various interference modulator configurations.

Figure 17A:
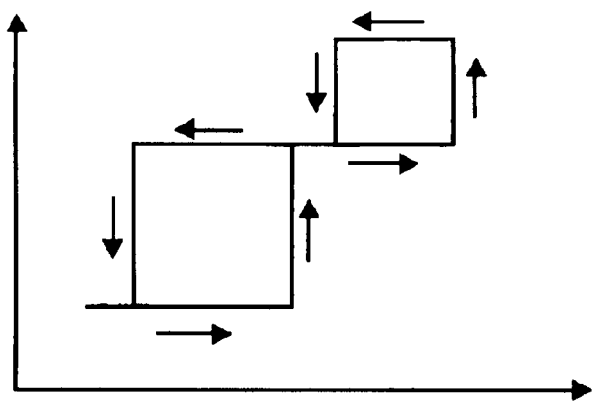
Figure 17B:
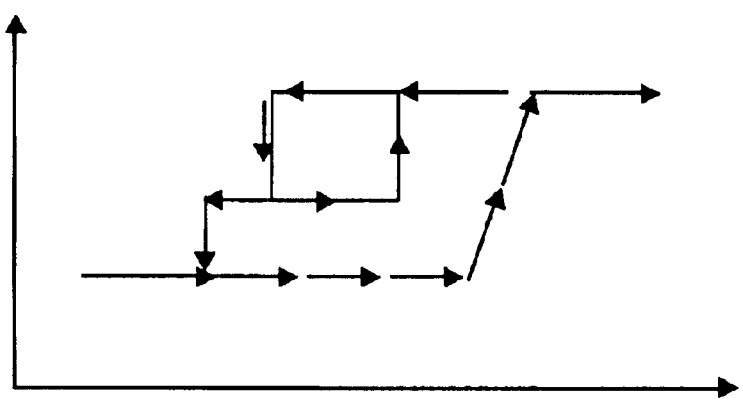
Figure 17C:
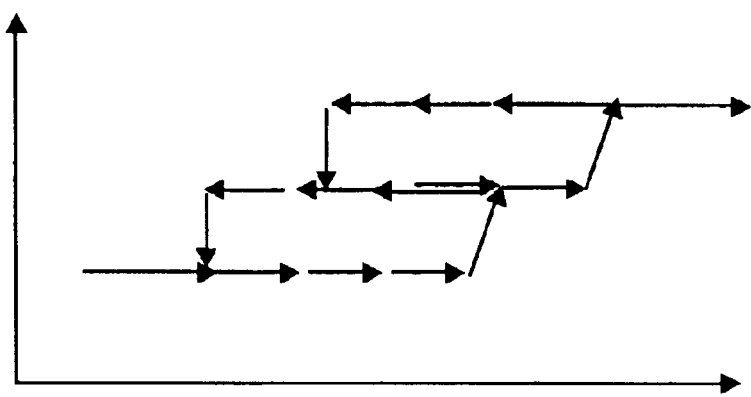

FIGS. 17a, 17b, and 17c show hysteresis curves.)

Figure 3:
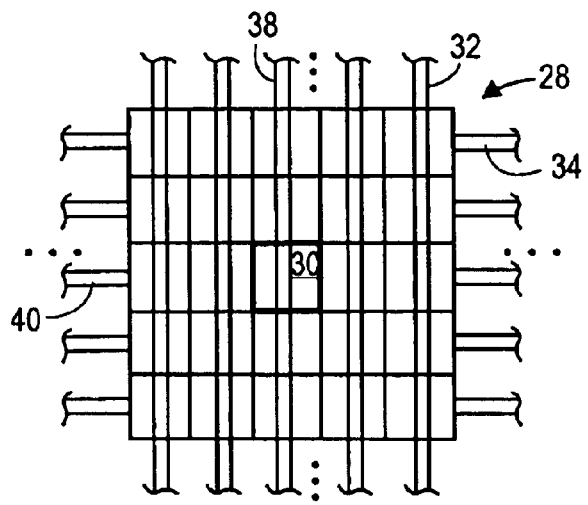
FIG. 3 is a top view of an iMoD array.

As shown in FIG. 3, in an array 28 of interferometric modulators (iMoDs) 30, each of the iMoDs can be controlled by providing a series of column electrodes 32 and row electrodes 34. A given iMoD in the array can be activated by applying an appropriate voltage between a row electrode 38 and a column electrode 40 associated with the target iMoD. (The row and column electrodes are shown as narrower than they would actually be, for clarity.)

A wide range of useful behaviors of cavity-type MEMS and arrays of them can be achieved by configuring the electrodes in other ways, for example, by adding one or more electrodes to one or more of the layers of the cavity.

Figure 4:
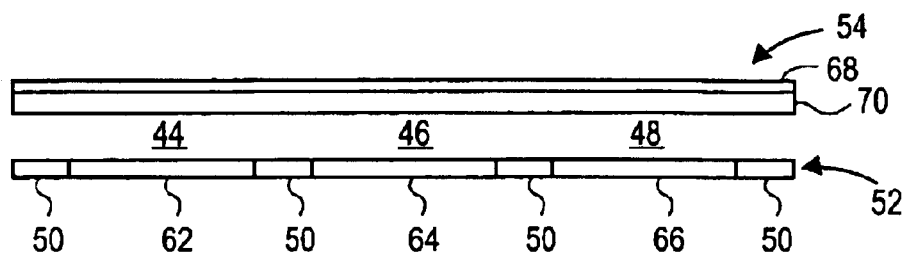
FIGS. 4 and 5 are a side view and a top view of an iMoD array.
Figure 5:
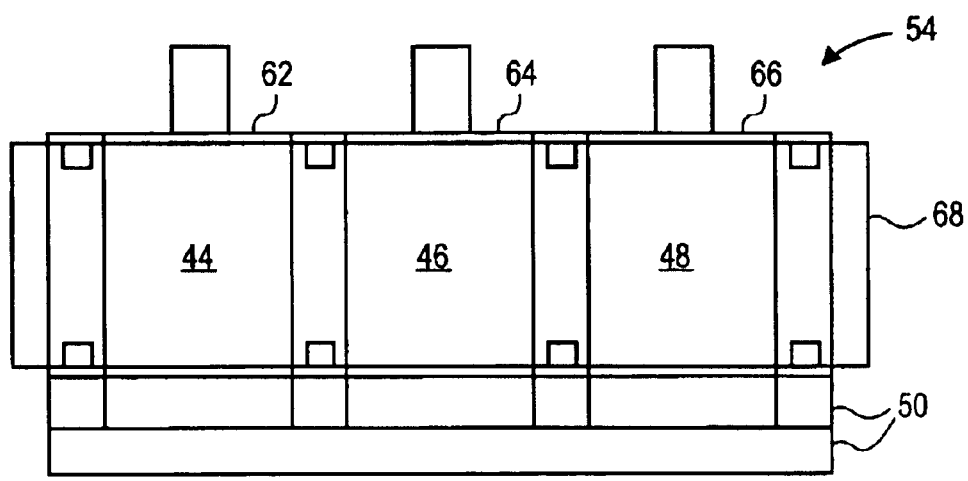

FIGS. 4 and 5 illustrate the addition of a latch electrode pattern 50 on the lower wall 52 of an array of iMoDs 54 that includes three iMoDs 44, 46, 48. The latch electrode pattern 50 is interleaved with the patterns of column electrodes 62, 64, 66 for each of the three columns that are shown in the figure (which shows only a fragment of a full display). A row electrode 68 lies on the mechanical membrane 70, which forms the upper walls of the cavities of the three iMoDs. The availability of the latch electrode permits a useful change in the hysteresis behavior of the cavity as illustrated in FIG. 6.

Figure 2:
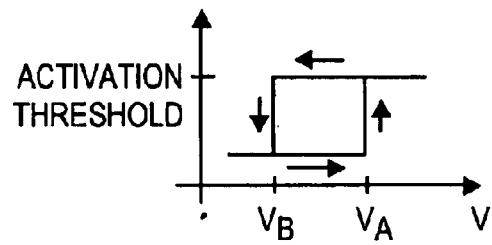
FIG. 2 shows a hysteresis curve.
Figure 6:
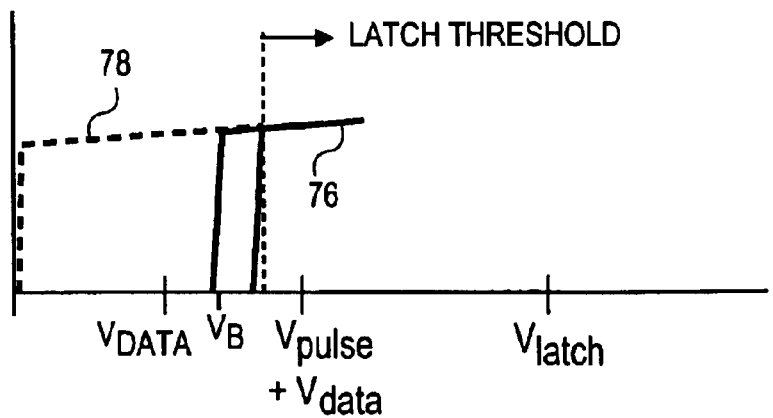
FIG. 6 shows a hysteresis curve.

In FIG. 6, the solid curve 76 is the response without a latch voltage applied, which reflects behavior similar to the behavior associated with the curve shown in FIG. 2. Actuation of one of the iMoDs occurs when the voltage between the row and column electrodes exceeds an actuation threshold and is maintained as long as a bias voltage of at least $V_B$ (which can be less than the activation voltage) is maintained.

Figure 1:
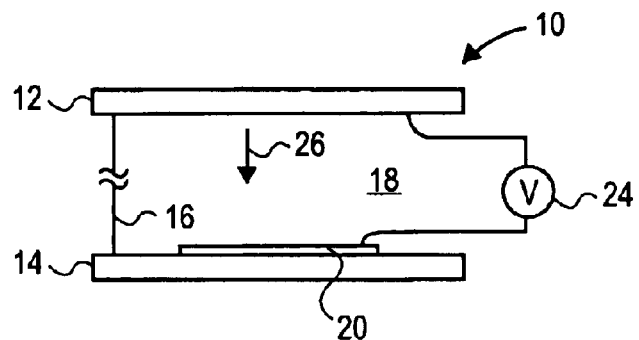
FIG. 1 is a schematic side view of a MEMS.

Unlike the cavity of FIG. 1, however, the activation of the iMoD can be maintained by applying the bias voltage between the membrane and the latch electrode instead of between the membrane and the column electrode. The dashed line 78 of FIG. 6 represents the hysteresis behavior of the device with reference to the voltage between the row and column electrodes when the bias voltage is applied at the latch electrode. Even if the voltage between the row and column electrodes (depicted along the x-axis of FIG. 6) falls to zero, the activation state is maintained. Because the hysteresis loop is effectively widened, it is easier to maintain the activation states of the iMoDs across the array, and the addressing voltages applied to the columns may be chosen with less concern for their impact on the states of the iMoDs.

Figure 7:
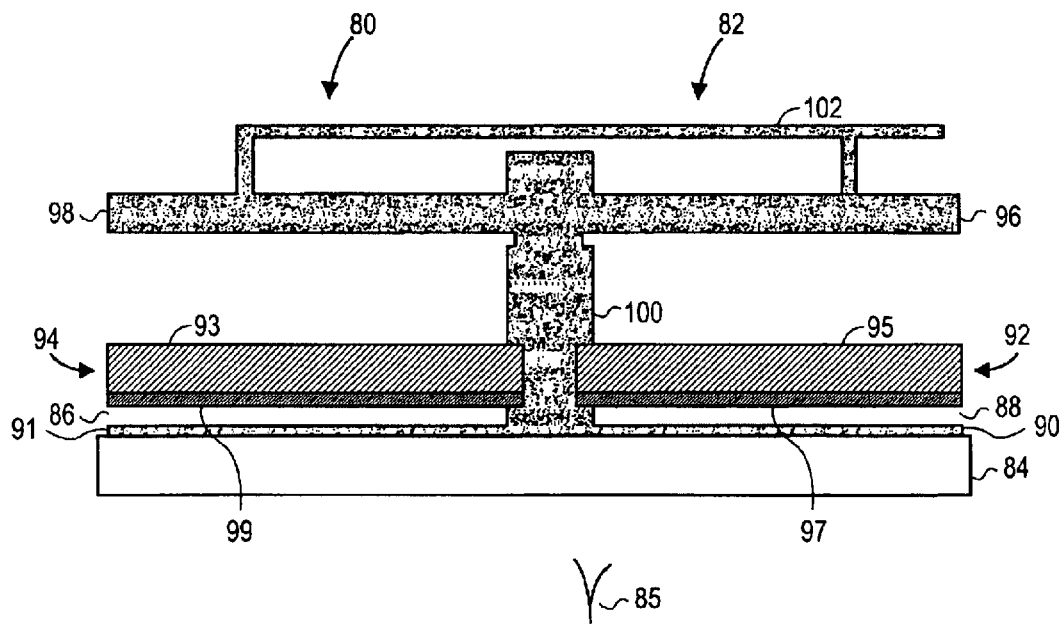

FIG. 7 shows a cross-section of dual non-inverted iMoDs 80, 82. The iMoDs are said to be non-inverted because they are viewed through the substrate 84 from locations 85 on the other side of the substrate from the cavities. By contrast, inverted designs are not viewed through the substrate. However, it should be noted that all of the embodiments described in this document can be used in both inverted and non-inverted designs. In each of the iMoDs, optical interference effects occur within an optical cavity 86, 88 that lies between the substrate and its associated optical stack 90, 91 and a mechanical membrane 92, 94 which is defined by the optical stack and the mechanical membrane. Each of the mechanical membranes 92, 94, includes a conductor/reflector layer 97, 99 beneath an insulator layer 95, 93. The insulating layers 95, 93 could also reside beneath actuation electrodes 96 and 98.

In an undriven state, each of the iMoDs may reflect white light. With a voltage applied between an actuation electrode 96, 98 (together called a bus) and the membrane 92, 94, the mechanical membrane is drawn upwards towards the actuation electrode bus and the reflected color changes. The bus and the mechanical membranes are supported by a post 100. The actuation electrodes may either be continuous between the two iMoDs or be connected by a bus jumper 102.

Figure 8:
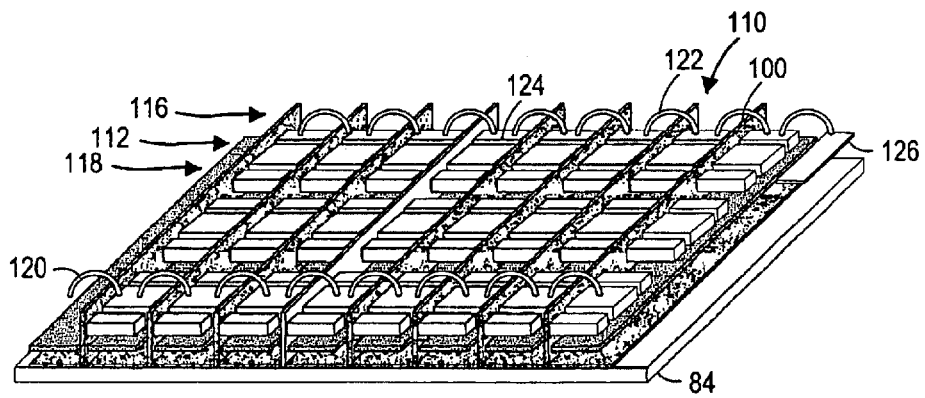

The bus structure of an array is shown in more detail in the three-dimensional view of FIG. 8. The figure reveals that the actuation electrode for each iMoD 110 can include more than one electrode component. Each iMoD is served by two electrode components, one component 112 lies in the middle of the iMoD; the other electrode contains into two elements 116 and 118 that lie on either side of the middle component. In FIG. 8, the electrodes are not continuous along each of the rows, but they are connected to form rows of electrodes by bus jumpers 120 (in the case of the center component 112) and by bus jumpers 122 and 124 in the case of the side elements 116 and 118. Buses 122 and 124 are connected by a jumper 126 at the end of the row. (Note that not all of the jumpers are shown for all of the iMoD rows in the figure, for clarity.)

The bus jumpers and other elements of the buses may be fabricated on multiple levels of a device to permit more complicated wiring schemes than those shown in FIG. 8. Any arbitrary number of electrodes, shapes of electrodes, and interconnections of electrodes may be useful in various implementations.

In FIG. 8, the mechanical membranes 130 define the columns The bus 122, 124 represents a supplementary connection which can be used for a global latch or other actuation voltage for arbitrary groupings of electrodes.

Although a particular configuration of electrodes and bus jumpers is shown in FIG. 8, a variety of arrangements are possible. For example, each iMoD could be served by any number of electrodes arranged in any of a variety of configurations. The electrodes of adjacent iMoDs could be connected in combinations other than simple rows. The connections could establish any arbitrary groupings of iMoDs. The groups of connected electrodes could be driven by a variety of driving voltages and driving regimes.

When multiple iMoDs are used for each pixel of a display, the electrode patterns and bus connections can be designed to enable the addressing of entire pixels or fractions of pixels.

Figure 9:
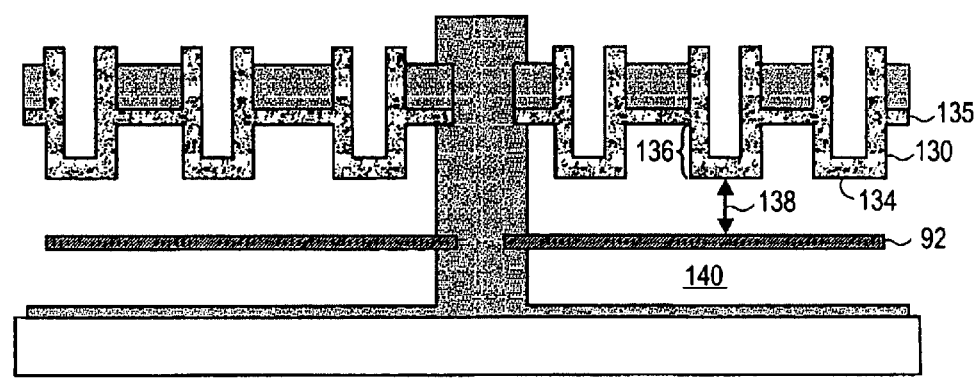
Figure 10:
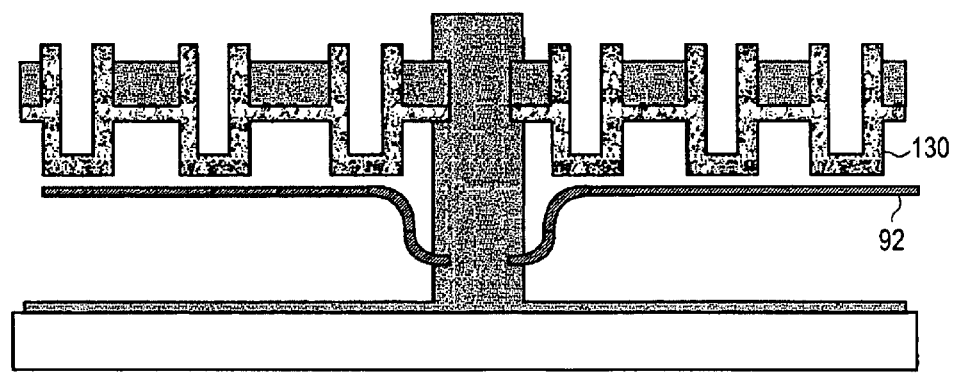
Figure 11:
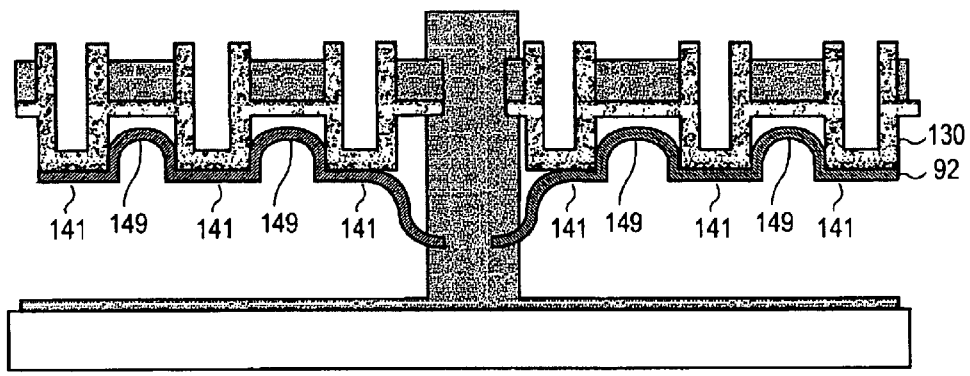

FIGS. 9, 10, and 11 show two iMoDs in three different states of actuation.

An iMoD can be designed to achieve three optical states including one that is not interferometric. Simpler iMoD designs, like those described in U.S. Pat. No. 6,055,090, achieve a reflective colored state using interference and a darkened black state via absorption. The dark state is achieved when there is a finite gap between the mechanical membrane and the absorbing film/stack. The dark state is achieved because the peak of the resulting standing wave is positioned optimally within the absorbing film/stack 135 to maximize absorption. When the mechanical membrane is moved into contact with, or much closer to, the absorbing film stack, the standing wave is moved out of position, yielding overall reflectivity of the absorbing film/stack, which reflects somewhat, with that of the mechanical membrane, which reflects a lot. In effect, the reflectivity of the mechanical membrane is degraded by the absorbing film. The result is a reflective white state.

The configuration of the array of FIGS. 9, 10, and 11 is similar to the configuration shown in FIGS. 7 and 8 except that the mechanical membrane 92 is thinner (because it does not include the insulator 93, 95), and the bus electrode is interrupted by insulator stops 130 situated in a series or array of holes in the bus electrode layer that correspond to the locations of the insulator stops.

In FIG. 9, with no voltage applied, the mechanical membrane rests in its as-manufactured state. By proper selection of materials and gap sizes, the optical cavity of each of the iMoDs produces a white appearance for a viewer looking through the substrate. For example, for the white state, the optical cavity gap 140 in the as-manufactured state would be as close to zero as possible, say 20 angstroms. Intimate contact would give the highest brightness but may not obtainable in an actual device.

As shown in FIG. 10, applying voltage between the bus electrode layer and the mechanical membrane causes the membrane to move into contact with the bottom faces 134 of the insulator stops. Because these stops are more closely spaced than the post supports, the spring constant in the span between two adjacent stops is effectively increased relative to the spring constant of the span between two adjacent posts. This increase produces an additional hysteresis mode as shown in FIG. 17a. Variations in the hysteresis behavior can also take the forms shown in FIGS. 17b, and 17c. Careful selection of the height 136 of these stops and the size 138 of the actuation cavity would place the optical cavity 140 into a dark reflective state when the mechanical membrane is actuated to the position shown in FIG. 10.

A further increase in voltage is required to actuate the membrane beyond the mechanical threshold defined by the insulator stops, as shown in FIG. 11. Careful selection of the height of the stops and the size of the actuation cavity would produce a colored state. The color would appear in the areas labeled 141 while the relatively small areas 149 would appear black. For example, as in the implementations discussed in U.S. Pat. No. 6,055,090, a combination of 50 nm of oxide and 435 nm of air would give a reflected green peak. Here, there is no oxide in the optical cavity, so a total spacing of about 500 nm of air would give a green peak.

The figures that show stops in them are not too scale. The insulating stops are very small compared to the overall area of the membrane. The portion of the mechanical membrane that is pulled all the way to the bus electrode is very large.

Figure 12:
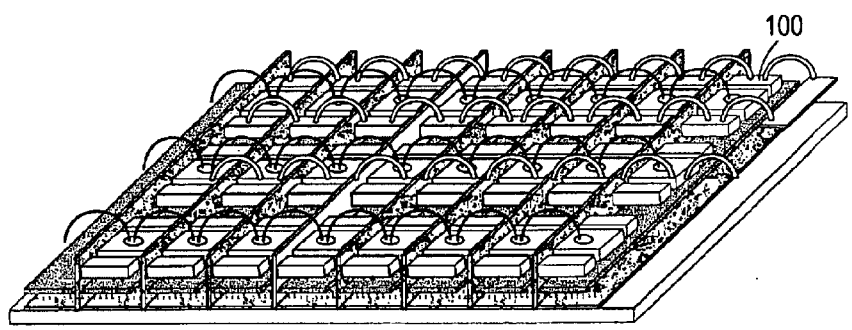
Figure 13:
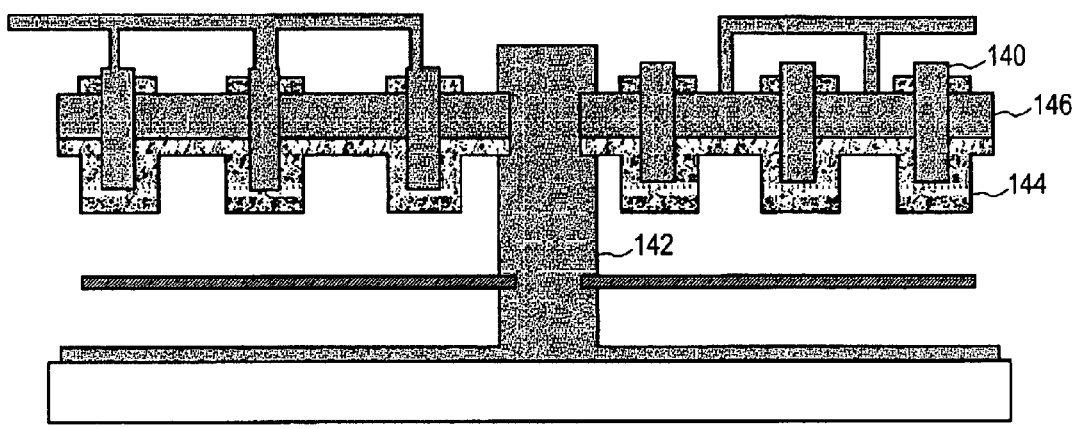

FIGS. 12 and 13 show three-dimensional and cutaway views of another arrangement. In this case, additional actuation electrodes 140 in the form of inset columns rest within the insulating posts 142 rather than on the plane of the other electrodes. This configuration allows for better control of the actuation voltages required to achieve the desired states by permitting the designer to select the height of the electrodes within the cavity. Because the inset electrodes are mechanically supported by the larger actuation electrode 146, their possible position and geometry re not significantly affected by the placement of the support posts, thus providing additional design flexibility.

Figure 14:
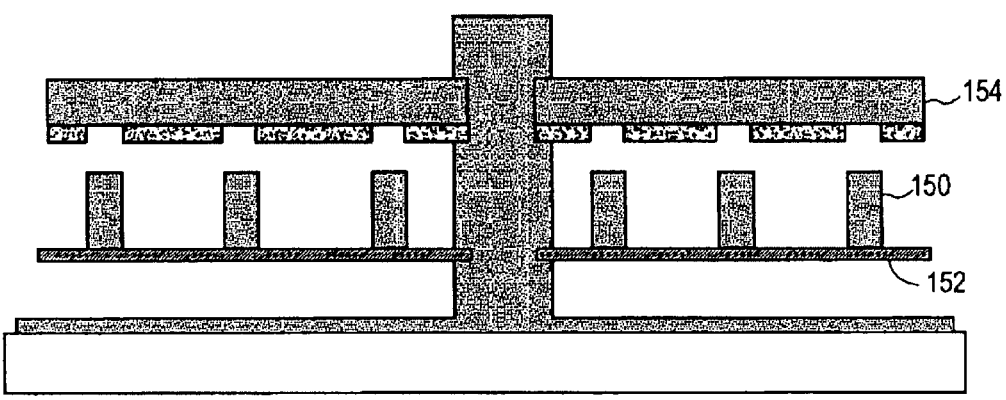
Figure 15:
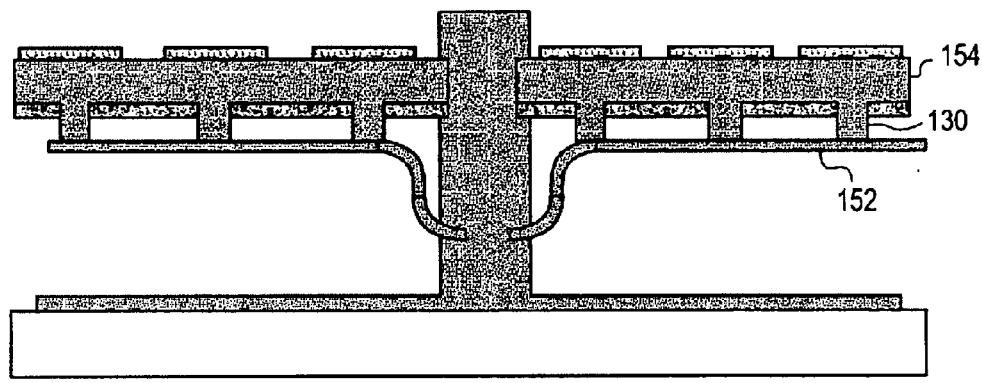
Figure 16:
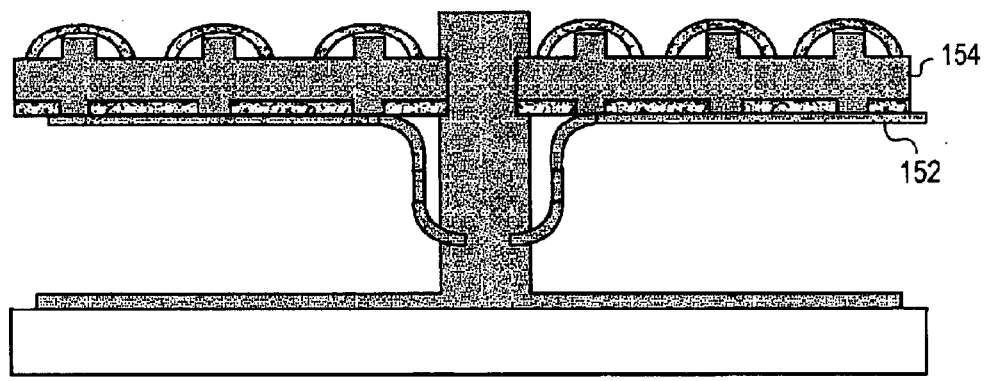

In another arrangement, shown in FIG. 14, membrane stops 150 are attached to the actuation cavity side of the mechanical membrane 152. These stops may be made from a dielectric material, a conductor, or a combination of the two in a configuration resembling the inset electrodes of FIGS. 12 and 13. Holes are provided in the actuation electrode through which the stops can pass when the membrane is actuated. In a second state, shown in FIG. 15, when the membrane is actuated, the stops may come to rest before they have fully penetrated the holes in the actuation electrode. In a third state, shown in FIG. 16, the stops have fully penetrated and the membrane touches the underside of the actuation electrode. The deformation that occurs occur in the mechanical membrane of FIG. 10 is avoided. The depth of actuation is controlled by optional mechanical stops (not shown) or by balancing of mechanical restorative and electrostatic forces. This configuration offers additional flexibility in designing actuation voltages and improves the fill factor.

Other implementations are within the scope of the following claims.

What is claimed is:

1. Apparatus comprising two walls defining a cavity having a cavity dimension, the cavity being configured so that the cavity dimension changes in response to electrostatic forces applied to the cavity, wherein the cavity dimension determines an optical response to light incident on the cavity, the optical response being based on interference, and at least two electrical structures configured to apply electrostatic forces in the vicinity of the cavity, the electrical structures being independently controllable.

2. The apparatus of claim 1 in which the optical properties include reflectance.

3. The apparatus of claim 1 in which the two electrical structures comprise electrodes.

4. The apparatus of claim 1 in which the electrical structures lie on a wall of the cavity.

5. The apparatus of claim 4 in which the two electrical structures lie side by side on the wall of the cavity.

6. The apparatus of claim 1 in which changes in the cavity dimension that occur in response to the electrostatics forces are characterized by hysteresis.

7. The apparatus of claim 1 also including a second cavity adjacent to the cavity, the cavity and the second cavity sharing a common wall.

8. The apparatus of claim 1 also including stops within the cavity, the stops defining an intermediate cavity dimension between a minimum cavity dimension and a maximum cavity dimension.

9. The apparatus of claim 8 in which the stops define channels between them in which portions of a wall of the cavity lie in response to electrostatic forces.

10. The apparatus of claim 8 in which one of the electrical structures comprises electrodes embedded within the stops.

11. The apparatus of claim 8 in which the stops lie on a movable wall of the cavity.

12. The apparatus of claim 11 also including apertures in a second wall of the cavity configured to receive the stops.

13. The apparatus of claim 1 also including additional cavities having cavity dimensions, each of the cavities being configured so that its cavity dimension changes in response to electrostatic forces applied to the cavity, and additional electrical structures configured to apply electrostatic forces in the vicinities of the cavities, each of the additional cavities being associated with at least two of the additional electrical structures, the electrical structures with which each of the cavities is associated being independently controllable.

14. The apparatus of claim 13, in which at least some of the electrical structures associated with at least some of the respective cavities are coupled together.

15. The apparatus of claim 13 in which the cavities are organized in groups by coupling together of selected electrical structures.

16. The apparatus of claim 15 in which the coupling comprises bus conductors.

17. The apparatus of claim 15 in which the coupling comprises bus elements fabricated on multiple levels of the apparatus.

18. Apparatus comprising an array of interferometric modulators, actuation electrodes associated with the respective interferometric modulators, and a pattern of conductors connecting the actuation electrodes in groups.

19. The apparatus of claim 18 in which the groups comprise rows or columns of the actuation electrodes.

20. The apparatus of claim 18 in which the groups comprise pixels of a display.

21. The apparatus of claim 18 in which each of the interferometric modulators is associated with more than one of the electrodes.

22. The apparatus of claim 21 in which the pattern of conductors connects different ones of the electrodes associated with each of the interferometric modulators in a configuration that enables them to be energized independently.

23. The apparatus of claim 18 in which the electrodes are arranged on walls of cavities of the interferometric modulators.

24. A method comprising energizing one electrical structure to apply an electrostatic force in the vicinity of a cavity; and independently energizing another electrical structure to apply an electrostatic force in the vicinity of the cavity.

25. The method of claim 24 in which the one structure is energized to move an element of the cavity to a first position, and the other electrical structure is energized to maintain the element in the first position.

26. The method of claim 25 also including de-energizing the one structure while the other structure remains energized.

27. The method of claim 24 also including controlling the energizing of the one electrical structure and the other electrical structure to effect more than two optical states of the cavity.

28. The method of claim 24 also including energizing one electrical structure to apply an electrostatic force in the vicinity of each of multiple other cavities, and independently energizing another electrical structure to apply an electrostatic force in the vicinity of each of the multiple other cavities.

29. The method of claim 28 also including controlling the energizing of the electrical structures to independently control the optical states of groups of one or more of the cavities.

* * * * *

UNITED STATES PATENT AND TRADEMARK OFFICE
CERTIFICATE OF CORRECTION

| | | |
|---|---|---|
| PATENT NO. | : 6,710,908 B2 | Page 1 of 1 |
| APPLICATION NO. | : 10/076224 | |
| DATED | : March 23, 2004 | |
| INVENTOR(S) | : Miles et al. | |

It is certified that error appears in the above-identified patent and that said Letters Patent is hereby corrected as shown below:

On the Title page after item (63), please delete the following:
"Continuation-in-part of application No. 09/974,544, filed on Oct. 10, 2001, and a continuation-in-part of application No. 09/378,143, filed on Aug. 20, 1999, now abandoned, and a continuation-in-part of application No. 09/056,975, filed on Apr. 8, 1998, which is a division of application No. 08/769,947, filed on Dec. 19, 1996, now abandoned, which is a continuation of application No. 08/744,253, filed on Nov. 5, 1996, now Pat. No. 5,986,796, which is a continuation-in-part of application No. 08/554,630, filed on Nov. 6, 1995, now abandoned, which is a continuation-in-part of application No. 08/238,750, filed on May 5, 1994, now Pat. No. 5,835,255."

And insert the following on the Title page item (63):
--Continuation-in-part of U.S. patent application serial number 09/378,143, filed August 20, 1999, which is a continuation of U.S. patent application Serial No. 08/744,253, filed November 5, 1996, now issued as U.S. Patent No. 5,986,796; a continuation-in-part of U.S. patent application Serial No. 09/056,975, filed April 18, 1998; and a continuation-in-part of U.S. patent application Serial No. 09/974,544, filed October 10, 2001, which is a divisional of U.S. patent application Serial No. 08/769,947, filed December 19, 1996, now abandoned, which is a continuation-in-part of U.S. patent application Serial No. 08/554,630, filed November 6, 1995, now abandoned, which is a continuation-in-part of U.S. patent application Serial No. 08/238,750, filed May 5, 1994, now issued as U.S. Patent No. 5,835,255, all incorporated here by reference.--

Signed and Sealed this

Twenty-first Day of October, 2008

JON W. DUDAS
*Director of the United States Patent and Trademark Office*